US008030252B2

(12) United States Patent
Shumway

(10) Patent No.: US 8,030,252 B2
(45) Date of Patent: *Oct. 4, 2011

(54) POLYMER-BASED, SURFACTANT-FREE, EMULSIONS AND METHODS OF USE THEREOF

(75) Inventor: William W. Shumway, Houston, TX (US)

(73) Assignee: Halliburton Energy Services Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/829,484

(22) Filed: Apr. 22, 2004

(65) Prior Publication Data
US 2005/0202978 A1 Sep. 15, 2005

Related U.S. Application Data

(63) Continuation-in-part of application No. 10/799,810, filed on Mar. 12, 2004, now Pat. No. 7,507,694.

(51) Int. Cl.
E21B 43/04 (2006.01)
C09K 8/64 (2006.01)

(52) U.S. Cl. ........ 507/224; 507/260; 507/261; 507/265; 507/266; 507/267; 166/308.2

(58) Field of Classification Search ............... None
See application file for complete search history.

(56) References Cited

U.S. PATENT DOCUMENTS

| 2,360,992 | A | * | 10/1944 | Weiss | 507/137 |
| 3,017,350 | A | * | 1/1962 | Fischer | 507/138 |
| 3,044,959 | A | * | 7/1962 | Martin | 507/263 |
| 3,125,517 | A | | 3/1964 | Voda et al. | 252/8.5 |
| 3,150,085 | A | * | 9/1964 | Mallory | 507/116 |
| 3,282,843 | A | * | 11/1966 | Alburger | 508/580 |
| 3,528,914 | A | * | 9/1970 | Darley | 507/107 |
| 3,826,771 | A | | 7/1974 | Anderson et al. | 260/39.6 H |
| 3,946,994 | A | | 3/1976 | Mertz et al. | 259/7 |
| 4,011,908 | A | | 3/1977 | Holm | |
| 4,018,426 | A | | 4/1977 | Mertz et al. | 259/7 |
| 4,033,784 | A | | 7/1977 | Lawson et al. | 134/20 |
| 4,068,676 | A | | 1/1978 | Thorn et al. | 137/13 |
| 4,107,057 | A | | 8/1978 | Dill et al. | 252/8.55 C |
| 4,108,681 | A | | 8/1978 | Lawson et al. | 134/20 |
| 4,108,779 | A | | 8/1978 | Carney | |
| 4,172,066 | A | * | 10/1979 | Zweigle et al. | 523/223 |
| 4,392,917 | A | | 7/1983 | Lipowski et al. | 162/168.1 |
| 4,460,483 | A | | 7/1984 | Weaver | 252/8.55 R |
| 4,480,696 | A | | 11/1984 | Almond et al. | 166/308 |
| 4,502,963 | A | | 3/1985 | Harmon | 252/8.5 P |
| 4,519,455 | A | | 5/1985 | Holtmyer et al. | 166/305 R |
| 4,554,082 | A | | 11/1985 | Holymyer et al. | 252/8.55 R |
| RE32,302 | E | | 12/1986 | Almond et al. | 166/308 |
| 4,627,495 | A | | 12/1986 | Harris et al. | 166/280 |
| 4,652,606 | A | | 3/1987 | Slingerland | |
| 4,659,486 | A | | 4/1987 | Harmon | 252/8.5 |
| 4,670,550 | A | | 6/1987 | Bleeker et al. | 536/114 |
| 4,772,646 | A | | 9/1988 | Harms et al. | 524/27 |
| H837 | H | | 11/1990 | Peiffer et al. | 252/8.511 |
| 5,021,170 | A | | 6/1991 | Shumate et al. | 252/8.515 |
| 5,057,234 | A | * | 10/1991 | Bland et al. | 507/128 |
| 5,194,422 | A | | 3/1993 | Mueller et al. | 507/136 |
| 5,232,910 | A | | 8/1993 | Mueller et al. | 507/139 |
| 5,252,554 | A | | 10/1993 | Mueller et al. | 507/138 |
| 5,254,531 | A | | 10/1993 | Mueller et al. | 507/131 |
| 5,294,353 | A | | 3/1994 | Dill | 252/8.553 |
| 5,318,956 | A | | 6/1994 | Mueller et al. | 507/139 |
| 5,355,958 | A | | 10/1994 | Pauls et al. | 166/307 |
| 5,427,699 | A | | 6/1995 | Pauls et al. | 507/244 |
| 5,476,543 | A | * | 12/1995 | Ryan | 106/487 |
| 5,489,394 | A | | 2/1996 | Ford et al. | 252/162 |
| 5,494,120 | A | | 2/1996 | Hale et al. | 175/72 |
| H1611 | H | * | 11/1996 | Patel | 507/103 |
| 5,697,458 | A | * | 12/1997 | Carney | 175/65 |
| 5,830,483 | A | | 11/1998 | Seidel et al. | 424/401 |
| RE36,066 | E | | 1/1999 | Mueller et al. | 507/138 |
| 5,869,434 | A | | 2/1999 | Mueller et al. | 507/110 |
| 5,909,774 | A | | 6/1999 | Griffith et al. | 166/312 |
| 5,939,081 | A | | 8/1999 | Ansmann et al. | 424/401 |
| 5,942,468 | A | * | 8/1999 | Dobson et al. | 507/136 |
| 5,990,050 | A | * | 11/1999 | Patel | 507/136 |
| 6,218,342 | B1 | | 4/2001 | Patel | 507/129 |
| 6,268,406 | B1 | | 7/2001 | Chatterji et al. | 523/130 |

(Continued)

FOREIGN PATENT DOCUMENTS

EP 0 137 538 B1 3/1990

OTHER PUBLICATIONS

Paper entitled "Chalk Emulsion: A New Completion and Workover Fluid" by H.C.H. Darley, Jul. 1972. SPE 77497 entitled "Crude Oil Emulsions: A State-Of-The Art Review" by Sunil Kokal, dated Oct. 2002.
Paper entitled "Factors Controlling the Stability of Colloid-Stabilized Emulsions" by David E. Tambe et al., Journal of Colloid and Interface Science, dated Jul. 1993.
Paper entitled "Factors Controlling the Stability of Colloid-Stabilizing Emulsions" by David E. Tambe et al., Journal of Colloid and Interface Science, dated Oct. 1994.
Paper entitled "A Study of the Formation of Water-In-Oil Emulsions" by Mark Bobra.
Paper entitled "Oil Well Drilling Fluids", pp. 320-324.
Paper entitled "Droplet-Droplet Interactions In Both Direct and Inverse Emulsions Stabilized by a Balanced Amphiphilic Polyelectrolyte," by Patrick Perrin, Langmuir The ACS Journal of Surfaces and Colloids, dated Feb. 8, 2000, vol. 16, No. 3.
Paper entitled "Amphiphilic Copolymers: A New Route to Prepare Ordered Monodisperse Emulsions," by P. Perrin, Langmuir 1998, 14, pp. 5977-5979.

(Continued)

Primary Examiner — John J Figueroa
(74) Attorney, Agent, or Firm — Craig W. Roddy; Karen B. Tripp

(57) ABSTRACT

In one embodiment, the present invention provides a drilling fluid composition that comprises a surfactant-free emulsion comprising an oleaginous fluid, a fluid that is at least partially immiscible with the oleaginous fluid, and a non-surfactant polymeric emulsifier. In another embodiment, the present invention provides a method of treating a subterranean formation comprising providing a treatment fluid that comprises a surfactant-free emulsion, the surfactant-free emulsion comprising an oleaginous fluid, a fluid that is at least partially immiscible with the oleaginous fluid, and a non-surfactant polymeric emulsifier; and treating the subterranean formation.

40 Claims, No Drawings

U.S. PATENT DOCUMENTS

| | | | |
|---|---|---|---|
| 6,315,042 B1 | 11/2001 | Griffith et al. | 166/291 |
| 6,410,035 B1 | 6/2002 | Gers-Barlag et al. | 424/401 |
| 6,422,325 B1 | 7/2002 | Krieger | 175/50 |
| 6,435,276 B1 | 8/2002 | Kercheville et al. | 166/255.1 |
| 6,524,384 B2 | 2/2003 | Griffith et al. | 106/705 |
| 6,596,670 B1 | 7/2003 | Mueller et al. | 507/136 |
| 6,608,006 B2 | 8/2003 | Taylor et al. | 507/131 |
| 6,620,770 B1 | 9/2003 | Kirsner et al. | 507/131 |
| 6,645,712 B1 | 11/2003 | Olijve et al. | 430/543 |
| 6,662,871 B2 | 12/2003 | Kercheville et al. | 166/255.1 |
| 6,666,268 B2 | 12/2003 | Griffith et al. | 166/292 |
| 6,668,929 B2 | 12/2003 | Griffith et al. | 166/292 |
| 6,691,805 B2 | 2/2004 | Thaemlitz | 175/65 |
| 6,822,039 B1 | 11/2004 | Monfreux-Gaillard et al. | |
| 7,026,272 B2 | 4/2006 | Reddy et al. | |
| 7,262,152 B2 | 8/2007 | Monfreux-Gaillard et al. | |
| 2001/0009890 A1 | 7/2001 | Patel et al. | 507/138 |
| 2001/0051593 A1 | 12/2001 | Patel | 507/129 |
| 2002/0033258 A1 | 3/2002 | Patel | 166/278 |
| 2002/0125013 A1 | 9/2002 | Kercheville et al. | 166/304 |
| 2002/0148609 A1 | 10/2002 | Kercheville et al. | 166/255.1 |
| 2003/0075360 A1 | 4/2003 | Patel et al. | 175/50 |
| 2003/0114316 A1 | 6/2003 | Patel et al. | 507/138 |
| 2004/0043905 A1 | 3/2004 | Miller et al. | |

OTHER PUBLICATIONS

Paper entitled "Shear-Induced Formation of Ordered Monodisperse Emulsions Stabilized By an Associating Amphiphilic Polyelectrolyt," by Patrick Perrin et al., Langmuir 2001, 17, pp. 2656-2663.
Paper entitled "Rheological Behavior of Highly Concentrated Oil-in-Water (o/w) Emulsions," by R. Pons, et al., Langmuir 1995, 11, pp. 1966-1971.
Paper entitled "UV-Visible Light: A Novel Route to Tune the Type of an Emulsion," by Iolanda Porcar et al., Langmuir 2001, 17, pp. 6905-6909.
Office action dated Jun. 15, 2006 from U.S. Appl. No. 10/799,810.
Office action dated Nov. 15, 2006 from U.S. Appl. No. 10/799,810.
Mike Mc Fadyen, et al., "New Synthetic Fluid System Provides Stable Cold-Temperature Rheologies," WorldOil Magazine—online magazine article, Jun. 2002, vol. 223.
Petrofree Product Brochure, Baroid Drilling Fluids.
Halliburton Press Release of Aug. 21, 2000 entitled "Halliburton Energy Services Participates in Drilling World Record Inclination Well," http/www.halliburton.com/news/archive.
Material Safety Data Sheet on EXP 3833, Alco Chemical, Apr. 12, 2000.
ALCOGUM SL-117 Product Data Sheet, Alco Chemical, Jan. 1, 2003.
ALCOGUM SL-920 Product Data Sheet, Alco Chemical, Jul. 15, 2004.
ALCOGUM L-344 Product Data Sheet, Alco Chemical, Mar. 25, 2004.
ALCOSPERSE 747 Product Data Sheet, Alco Chemical, Mar. 15, 2002.
ALCOQUEST 747 Product Data Sheet, Alco Chemical, Sep. 18, 2002.
NOVAMUL Product Data Sheet, M-I Drilling Fluids L.L.C., 1997.
Office Action from U.S. Appl. No. 10/799,810 dated Apr. 6, 2007.

* cited by examiner

POLYMER-BASED, SURFACTANT-FREE, EMULSIONS AND METHODS OF USE THEREOF

RELATED APPLICATION

This application is a continuation-in-part of U.S. patent application Ser. No.: 10/799,810, filed Mar. 12, 2004 now U.S. Pat. No. 7,507,694, and entitled "Surfactant-Free Emulsions and Methods of Use Thereof," the content of which is incorporated herein by reference.

BACKGROUND OF THE INVENTION

1. Field of the Invention

The present invention relates to emulsion based drilling and well treatment fluids and methods of using such fluids in the oil and gas industry with improved environmental compatibility. More particularly, the present invention relates to surfactant-free emulsions and their use in subterranean applications.

2. Brief Description of Relevant Art

Emulsions usually comprise two immiscible phases. The two immiscible phases include a continuous (or external) phase and a discontinuous (or internal) phase. The discontinuous phase comprises the secondary fluid that usually exists in droplets in the continuous phase. Two varieties of emulsions are oil-in-water and water-in-oil. Oil-in-water emulsions usually include a fluid at least partially immiscible in an oleaginous fluid (usually an aqueous-based fluid) as the continuous phase and an oleaginous fluid as the discontinuous phase. Water-in-oil emulsions are the opposite, having the oleaginous fluid as the continuous phase and a fluid at least partially immiscible in the oleaginous fluid (usually an aqueous-based fluid) as the discontinuous phase. Water-in-oil emulsions may also be referred to as invert emulsions.

Such emulsions have been used widely in oil and gas applications. For instance, emulsion based fluids are widely used in the oil and gas industry for drilling and other subterranean treatment applications, including various drilling, production, and completion operations. These drilling and well treatment fluids may also be referred to as muds. Invert emulsions may be used when oleaginous-based treatment fluids are expected to have superior performance characteristics when compared with water-based muds, as in situations, e.g., where there is an abundance of water reactive materials in a well bore. These superior performance characteristics may include, e.g., better lubrication of the drill strings and downhole tools, thinner filter cake formation, and better hole stability. An emulsification of water-in-oil, without having any emulsifying agent capable of stabilizing the fluid that is at least partially immiscible in the oleaginous fluid typically will undergo a rapid and natural degradation processes including droplet coalescence and Ostwald ripening, until the two phases which are at least partially immiscible separate and the emulsion no longer exists. Having an unstable invert emulsion may be problematic because if the emulsion destabilizes, it may not have consistent, reliable properties. This problem may be exacerbated by the physical forces that the emulsion may undergo when being used in subterranean applications, such as thermal, mechanical, and chemical stresses. Emulsion stabilizing agents, sometimes referred to as emulsifiers, may be useful in invert emulsions (and emulsion based drilling and well treatment fluids) to stabilize the emulsions, especially when used in subterranean applications.

Emulsion stabilizing agents traditionally used in drilling and well treatment fluids are surfactant-based. Structurally, surfactant-based emulsion stabilizing agents usually comprise a hydrophobic portion—a tail—that is attracted to the oil phase and a hydrophilic portion—a head—that is attracted to the water phase. Generally, the hydrophobic portion interacts with the oil and the hydrophilic portion interacts with the nonoleaginous fluid. These interactions generally decrease the surface tension of the interface between the water droplet and the oil, which may slow the natural tendency of the two immiscible phases to separate.

However, surfactant-based emulsion stabilizing agents may be problematic, as they may suffer from problems that include some potential or possible toxicity, limited range of oil to water ratios, thermal destabilization, propensity for droplet coalescence, and intolerance to various salts and other chemical agents. The potential or possible toxicity of the surfactants can create potential dangers for the environment. For example, surfactants may have adverse effects on shrimp and other aqueous species, along with poor biodegradability. Further, a surfactant is typically capable of stabilizing either an oil-in-water emulsion or a water-in-oil emulsion, but not both. Because of the necessity to carefully balance the chemical interactions of the surfactant to the type of micelle formed, typical surfactants generally can be used only with a limited oil to water ratio range. Because they diffuse in and out of the micelles, surfactant-based agents typically form a meta-stable structure around the micelle. This meta-stable structure allows such forces as coalescence, which may result in phase separation and eventual emulsion instability.

SUMMARY OF THE INVENTION

The present invention relates to improved emulsion based drilling and well treatment fluids and methods of using such fluids in the oil and gas industry. More particularly, the present invention relates to surfactant-free emulsions and their use in subterranean applications, especially in well bore treatment fluids, drilling fluids and the like.

The present invention provides a surfactant-free polymer based emulsion stabilizing agent or emulsifier having both hydrophobic groups or moieties and hydrophilic groups or moieties that may be used to stabilize water-in-oil (invert) emulsions and/or oil-in-water emulsions comprising drilling and well treatment fluids. The particular function of the emulsifier will depend on its balance of hydrophilic and hydrophobic groups. The greater number of water soluble moieties the polymer has, the greater will be the propensity of the polymer to stabilize oil-in-water emulsions. The emulsion may be broken by breaking up the polymer or by otherwise changing the character of the polymer, such as for example by changing the ratio of hydrophilic to hydrophobic groups comprising the polymer or by changing the pH of the fluid sufficiently to change the charge or nature of the polymer.

The non-surfactant polymeric emulsifier of the invention has substantial advantages over traditional surfactant emulsifiers. The size of the polymeric emulsifier, preferably between about 2000 and 100,000 molecular weight (mw), is larger than a typical surfactant. This larger molecular size often results in less toxicity. Further, the polymeric emulsifier of the invention affords high internal phase fractions, which results in improved Theological behavior for drilling applications. Additionally, the polymeric emulsifier of the invention provides enhanced droplet stability. Because the polymeric emulsifier is substantially absorbed, even perhaps virtually irreversibly absorbed, at the oil water interface of the emulsion droplet, the polymeric emulsifier provides a powerful barrier to droplet coalescence and phase separation. In contrast, traditional emulsifiers, such as surfactants, diffuse in and out of micelles and therefore droplets readily undergo coalescence and Ostwald ripening leading to phase separation.

In one embodiment, the present invention provides a method of treating a well penetrating a subterranean formation comprising providing a well treatment fluid that comprises a surfactant-free emulsion, the surfactant-free emulsion comprising an oleaginous fluid, a fluid that is at least partially immiscible with the oleaginous fluid, and a polymer based emulsion stabilizing agent (or a non-surfactant polymer emulsifier); and treating the well.

In another embodiment, the present invention provides a method of emulsifying an oil-based drilling fluid comprising providing the base oil, a fluid that is at least partially immiscible with the base oil and a polymer based emulsion stabilizing agent (or a non-surfactant polymer emulsifier); and mixing the base oil, the fluid that is at least partially immiscible with the base oil, and the a polymer based emulsion stabilizing agent so as to form a surfactant-free oil-based emulsion drilling fluid.

In another embodiment, the present invention provides a method of drilling a well bore in a subterranean formation using a surfactant-free emulsion drilling fluid comprising an oleaginous fluid, a fluid that is at least partially immiscible with the oleaginous fluid, and a polymer based emulsion stabilizing agent (or a non-surfactant polymer emulsifier).

In another embodiment, the present invention provides a method of making a drilling fluid that comprises a surfactant-free emulsion comprising mixing an oleaginous fluid, a fluid that is at least partially immiscible with the oleaginous fluid, and a polymer based emulsion stabilizing agent (or a non-surfactant polymer emulsifier) so as to form a surfactant-free emulsion.

In one embodiment, the present invention provides a method of fracturing a subterranean formation comprising providing a surfactant-free emulsion composition comprising an oleaginous fluid, a fluid that is at least partially immiscible with the oleaginous fluid, a polymer based emulsion stabilizing agent (or a non-surfactant polymer emulsifier), and proppant particulates; placing the surfactant-free emulsion composition into the subterranean formation at a pressure sufficient to create or enhance at least one fracture therein; and removing the surfactant-free emulsion composition from the subterranean formation while leaving at least a portion of the proppant particulates in the fracture.

In another embodiment, the present invention provides a method of installing a gravel pack comprising providing a gravel pack surfactant-free emulsion composition comprising an oleaginous fluid, a fluid that is at least partially immiscible with the oleaginous fluid, and a polymer based emulsion stabilizing agent (or a non-surfactant polymer emulsifier); and introducing the composition to a well bore penetrating a subterranean formation so that the gravel particulates form a gravel pack substantially adjacent to a desired location in the well bore.

In another embodiment, the present invention provides a drilling fluid composition that comprises a surfactant-free emulsion comprising an oleaginous fluid, a fluid that is at least partially immiscible with the oleaginous fluid, and a polymer based emulsion stabilizing agent (or a non-surfactant polymer emulsifier).

In another embodiment, the present invention provides a treatment fluid comprising a surfactant-free emulsion, wherein the surfactant-free emulsion comprises an oleaginous fluid, a fluid that is at least partially immiscible with the oleaginous fluid, and a polymer based emulsion stabilizing agent (or a non-surfactant polymer emulsifier).

The features and advantages of the present invention will be readily apparent to those skilled in the art upon a reading of the description of the preferred embodiments which follows.

DESCRIPTION OF PREFERRED EMBODIMENTS

The present invention relates to improved emulsion based drilling fluids and well treatment fluids and methods of using such emulsion-based fluids in the oil and gas industry. More particularly, the present invention relates to surfactant-free emulsions and their use in subterranean applications, especially in well bore treatment fluids, drilling fluids and the like.

The present invention provides surfactant-free emulsions for use in any application in which an emulsion may be suitable in the oil field. The surfactant-free emulsions of the present invention avoid many of the problems associated with surfactants used in traditional emulsions, while maintaining or even enhancing the stability associated with surfactant stabilized emulsions. For example, because embodiments of the present invention do not use surfactants, they do not pose the same potential environmental risks often associated with traditional surfactant-based emulsions.

In a preferred embodiment of the invention, the surfactant-free emulsion compositions of the present invention generally comprise an oleaginous fluid, a fluid that is at least partially immiscible with the oleaginous fluid, and a polymer based emulsion stabilizing agent (or a non-surfactant polymeric emulsifier). The surfactant-free emulsion compositions of the present invention may be suitable for use in a variety of oil field applications wherein oil-in-water or water-in-oil emulsions are suitable. These may include subterranean applications comprising stimulation operations such as fracturing and sand control treatments such as installing a gravel pack. These may also include drilling operations. One of ordinary skill in the art, with the benefit of this disclosure, will recognize other suitable uses for these surfactant-free emulsion compositions in the oil field.

The oleaginous fluid used in the emulsion compositions of the present invention may comprise any oil-based fluids suitable for use in emulsions. The oleaginous fluid may be from a natural or synthetic source. Examples of suitable oleaginous fluids include without limitation diesel oils, crude oils, paraffin oils, mineral oils, low toxicity mineral oils, olefins, esters, amides, amines, synthetic oils such as polyolefins, polydiorganosiloxanes, siloxanes, organosiloxanes and combinations thereof, ethers, acetals, dialkylcarbonates, hydrocarbons and combinations thereof. Additional examples of suitable oleaginous fluids include without limitation those commercially available from Halliburton Energy Services, Inc., in Houston, Tex. and/or Duncan, Okla., in association with the trademarks "ACCOLADE® internal olefin and ester blend invert emulsion base fluid," "PETROFREE® ester based invert emulsion base fluid," "PETROFREE® LV ester based invert emulsion base fluid," and "PETROFREE® S.F internal olefin based invert emulsion base fluid." Factors that determine which oleaginous fluid will be used in a particular application, include but are not limited to, the cost and performance characteristics of the oleaginous fluid. An additional factor that may be considered is the polarity of the oleaginous fluid. For example, diesel oils are generally more polar than paraffin oils. Other factors that may be considered are environmental compatibility and regional drilling practices. For example, in North Sea applications, an ester or internal olefin (IO) may be preferred. In the Gulf of Mexico, applications may prefer to utilize "ACCOLADES®" fluid or a low toxicity mineral oil. One skilled in the art with the benefit of this disclosure will be able to choose a suitable oleaginous fluid for a particular application in view of these considerations.

The emulsion compositions of the present invention also comprise a fluid that is at least partially immiscible in the oleaginous fluid. This partially immiscible fluid is a non-oleaginous fluid that is mutually insoluble with the chosen oleaginous fluid. Suitable examples of partially immiscible fluids include without limitation aqueous-based fluids, glycerin, glycols, polyglycol amines, polyols, derivatives thereof that are partially immiscible in the oleaginous fluid, and combinations thereof. Aqueous-based fluids may include, but are not limited to, fresh water, sea water, salt water, and brines (e.g., saturated salt waters). Suitable brines may include heavy brines. Heavy brines, for the purposes of this application, include brines that may be used to weight up a fluid, such as a treatment fluid, instead of using traditional weighting agents. Brines may comprise $H_2O$ soluble salts. In certain exemplary embodiments, suitable $H_2O$ soluble salts may comprise sodium chloride, calcium chloride, calcium bromide, zinc bromide, potassium carbonate, sodium formate, potassium formate, sodium acetate, potassium acetate, calcium acetate, ammonium acetate, ammonium chloride, ammonium bromide, sodium nitrate, potassium nitrate, ammonium nitrate, calcium nitrate, sodium carbonate, potassium carbonate, and combinations thereof. In other exemplary embodiments, the $H_2O$ soluble salt may be any salt which reduces the water phase activity of the emulsion. Factors that determine what partially immiscible fluid will be used in a particular application include for example, without limitation, cost, availability, and which oleaginous fluid has been chosen. Another factor that may be considered is the application of the emulsion. For example, if the application needs an emulsion with a heavy weight, a zinc bromide brine (for example) may be chosen. One skilled in the art with the benefit of this disclosure in view of the considerations will be able to choose a particularly suitable partially immiscible fluid for a particular application.

The emulsion compositions of the present invention further comprise a polymer based emulsion stabilizing agent (or a non-surfactant polymeric emulsifier) having hydrophobic moieties and hydrophilic moieties and the ability to emulsify or to stabilize emulsions of oil in water or water in oil. Suitable polymers include, but are not limited to, homopolymers, copolymers, terpolymers, and hydrophobically modified copolymers. Examples of suitable commercially available polymers include "ALCOSPERSE® 747" polymer (an ethylacrylate/methacrylic acid polymer of roughly 100,000 molecular weight hydrophobically modified with long chain fatty acid alcohol ethoxylates), and "ALCOQUEST® 747" polymer (an ethylacrylate/methacrylic acid polymer of roughly 100,000 molecular weight hydrophobically modified with long chain fatty acid alcohol ethoxylates), and EXP 3833™ acrylate copolymer, all available from Alco-Chemical, a group of Imperial Chemical Industries PLC, in Chattanooga, Tenn. Polymers are generally readily available, of reasonable cost, and provide ease of handling. Any commercially available polymers having hydrophobic moieties and hydrophilic moieties may be tested and adjusted for use in a particular drilling or treatment fluid according to the present invention. Adding salts or modifying the pH of the fluid can improve or reduce the emulsion stabilizing effect of the polymer, depending on the structure and composition of the polymer. The polymer will provide the most stable emulsion when its hydrophobic and hydrophilic moieties are well balanced for the intended purpose of the emulsion, as previously discussed. Preferably, the polymer will be non-reactive with the subterranean formation and will be compatible with other components comprising the drilling fluid or well treatment fluid.

Preferably in the present invention, the polymer, or polymeric material, is selected or formulated to have between about 2000 and 100,000 molecular weight, with both hydrophilic and hydrophobic moieties. The mixture or positioning in the polymer chain, and/or the ratio, of hydrophilic and hydrophobic moieties, will determine whether the polymer stabilizes water-in-oil or oil-in-water emulsions. The greater the number of water soluble moieties comprising the polymer, the greater the propensity of the polymer to stabilize oil-in-water emulsions. The polymer may be amphoteric but does not have to be amphoteric.

The polymeric emulsifiers afford high internal phase fractions. Internal phase fractions of up to 0.96 or higher are possible. High internal phase ratio emulsions provide enhanced rheological properties as well enhanced carrying ability or suspension characteristics to drilling fluids and well treatment fluids. Internal phase ratios as low as 0.1% may also be achieved when high internal phase fractions are not desired. When subjected to sufficiently low rates of shear, high internal phase ratio emulsions behave similar to elastic solids. As the rate of shear is increased, a point is reached where they begin to flow—the yield point—(which varies depending on the formulation of the emulsion). When such emulsions are subjected to increasingly higher rates of shear, they exhibit non-Newtonian behavior, and the effective viscosity decreases.

Additionally, the polymeric emulsifiers provide enhanced droplet stability. Because the polymer emulsifiers are absorbed substantially or virtually irreversibly at the oil water interface, they provide a powerful barrier to droplet coalescence and phase separation. Unlike traditional or surfactant emulsifiers, polymeric emulsifiers do not diffuse in and out of micelles causing droplets to undergo coalescence and Ostwald ripening which leads to phase separation. Further, not only are the emulsions of the invention typically more stable than traditional surfactant stabilized emulsions, but they are more controllably and easily broken when desired. Emulsions of the present invention, stabilized with non-surfactant polymeric emulsifiers, may be broken by breaking the polymer into smaller pieces, sufficiently small as to be incapable of providing emulsions stabilization. Polymer breakers suitable for this purpose will depend on the formulation of the polymer and compatibility with the use and purpose of the well treatment fluid and the subterranean formation. The emulsion may alternatively be broken by otherwise changing the character of the polymer, such as for example by changing the ratio of hydrophilic to hydrophobic groups comprising the polymer or by changing the pH of the fluid sufficiently to change the charge or nature of the polymer.

Upon mixing the surfactant-free polymer emulsifier with the oleaginous fluid and the fluid that is at least partially immiscible with the oleaginous fluid, a surfactant-free emulsion is formed. An advantage of the surfactant-free emulsions of the present invention includes the ability to form an emulsion off-site, store the emulsion for a chosen length of time, and then transport the emulsion to the work-site with an acceptable amount of minimal loss in emulsion characteristics.

In certain embodiments, a surfactant-free emulsion of the present invention may be an emulsified brine. In a preferred embodiment, the non-surfactant polymeric emulsifier will be used in stabilizing a light weight, viscous water or brine based fluid in its oil-in-water emulsion form. The presence of some salts, such as for example, calcium chloride, is believed needed. An advantage of such embodiments is the ability to emulsify a wide variety of brines and brine concentrations with the non-surfactant polymeric emulsifier. The emulsified brine composition may comprise a heavy brine, including for example a zinc bromide brine. In other exemplary embodiments of the present invention, the brine may comprise any $H_2O$ soluble salt; examples of such suitable brines may comprise sodium chloride, calcium chloride, calcium bromide, zinc bromide, or potassium carbonate. One skilled in the art with the benefit of this disclosure will recognize other suitable brines for use with this invention.

Other types of emulsion additives (or drilling fluid additives or well treatment fluid additives) optionally may be added to the emulsion compositions of the present invention including, but not limited to, weighting agents, wetting agents, fluid loss agents, viscosifying agents, thinning agents, lubricants, anti-oxidants, surfactants that are suitable for a purpose other than stabilizing an emulsion, corrosion inhibitors, scale inhibitors, and the like. When used in certain applications, the emulsion compositions of the present invention may include particulates such as proppant or gravel. One of ordinary skill in the art with the benefit of this disclosure will recognize the appropriate type of additive or additives for a particular application.

In certain embodiments, the emulsions of the present invention may be included in or comprise a well treatment fluid, but optionally or alternatively may not comprise the base of the fluid. In such case where the emulsion is not the base of the fluid, a suitable base fluid compatible with the emulsion(s) is used.

The drilling and well treatment fluids of the present invention are used in drilling or treating subterranean formations. Drilling or well treatment operations may involve drilling a well-bore, completing a well, stimulating the subterranean formation with treatments such as a fracturing or acid stimulation (such as, for example, a matrix acidizing process or an acid fracturing process), or carrying out a sand control treatment (such as a gravel packing treatment). In certain embodiments of the methods of the present invention, fracturing may be accomplished by injecting a viscous fracturing fluid comprising an emulsion composition of the present invention into the subterranean formation at a rate and pressure sufficient to cause the formation to break down and produce one or more fractures. Other embodiments include sand control treatments such as gravel packing. A gravel packing operation may involve placing a gravel pack screen in the well bore and packing the surrounding annulus between the screen and the well bore with particulates often referred to as "gravel" that have a specific size chosen to prevent the passage of formation sand by using a gravel pack fluid comprising an emulsion composition of the present invention. One skilled in the art, with the benefit of this disclosure, will recognize other suitable uses for these drilling and treatment fluids.

Optionally, the drilling and treatment fluids of the present invention may comprise one or more viscosifiers, proppant particulates and/or gravel particulates. A viscosifier may be used in a drilling or treatment fluid to adjust (i.e,. increase) the viscosity of the fluid to a desired viscosity. Typical viscosifiers include polyacrylamide polymers and biopolymers such as xanthan and scleroglucan polymers Proppant particulates may comprise a filler material, inter alia, to fill voids, cavities, crevices, channels behind casing strings, or channels within the subterranean formation. Gravel particulates used in accordance with the present invention are generally filler material of a size such that formation particulates that may migrate with produced fluids are prevented from being produced from the subterranean formation.

An example of a method of the present invention is a method of treating a subterranean formation comprising the steps of providing a treatment fluid comprising a surfactant-free emulsion comprising an oleaginous fluid, a fluid that is at least partially immiscible with the oleaginous fluid, and a non-surfactant polymeric emulsifier; and treating the subterranean formation. In certain exemplary embodiments of the present invention, a method of treating a subterranean formation includes a well completion operation or a drilling operation. In other exemplary embodiments of the present invention, a method of treating a subterranean formation includes a stimulation operation. Examples of stimulation operations of the present invention include fracturing operations and acid stimulation operations, like matrix acidizing and fracturing acidizing processes.

Another example of a method of the present invention is a method of drilling a well bore in a subterranean formation using a surfactant-free emulsion drilling fluid comprising an oleaginous fluid, a fluid that is at least partially immiscible with the oleaginous fluid, and a non-surfactant polymer emulsifier or emulsion stabilizing agent.

Another exemplary method of the present invention is a method of making a drilling fluid that comprises a surfactant-free emulsion comprising mixing an oleaginous fluid, a fluid that is at least partially immiscible with the oleaginous fluid, and a non-surfactant polymer emulsifier so as to form a surfactant-free emulsion.

Another method of the present invention is a method of fracturing a subterranean formation comprising the steps of providing a surfactant-free emulsion composition comprising an oleaginous fluid, a fluid that is at least partially immiscible with the oleaginous fluid, non-surfactant polymer emulsifier, and proppant particulates; placing the surfactant-free emulsion composition into the subterranean formation at a pressure sufficient to create or enhance at least one fracture therein; and removing the surfactant-free emulsion composition from the subterranean formation while leaving at least a portion of the proppant particulates in the fracture. A breaker may be included in the compositions of the present invention if desired to reduce the viscosity of the emulsion composition at the requisite time in the process.

Another example method of the present invention is a method of installing a gravel pack comprising the steps of providing a gravel pack surfactant-free emulsion composition comprising a an oleaginous fluid, a fluid that is at least partially immiscible with the oleaginous fluid, non-surfactant polymeric emulsifier, and gravel particulates; and introducing the composition to a well bore penetrating a subterranean formation so that the gravel particulates form a gravel pack substantially adjacent to a desired location in the well bore.

An exemplary embodiment of the present invention is a drilling fluid composition that comprises a surfactant-free emulsion comprising an oleaginous fluid, a fluid that is at least partially immiscible with the oleaginous fluid, and non-surfactant polymeric emulsifier. Another exemplary embodiment of the present invention includes a treatment fluid comprising a surfactant-free emulsion, wherein the surfactant-free emulsion comprises an oleaginous fluid, a fluid that is at least partially immiscible with the oleaginous fluid, and non-surfactant polymeric emulsifier.

Other exemplary embodiments of the present invention generally include methods for drilling, completing, stimulating, and working over a well using the emulsions of the present invention.

To facilitate a better understanding of the present invention, the following examples are given. In no way should the following examples be read to limit or define the scope of the invention.

EXAMPLE

Five polymer samples were used to prepare emulsions using the following procedure. In each of 5 mixing cups, 180 g. SF BASE™ oleaginous fluid, available from Halliburton Energy Services, Inc. in Houston, Tex., was provided. To this fluid was added 10 ml of a polymer sample and mixed on a multimixer. After mixing, 150 ml water was added and each sample was mixed again for 20 minutes. The polymer samples were observed and then allowed to stand overnight. Calcium chloride (30 g) was then added to each sample and the samples were mixed for 20 minutes on a multimixer. The polymer samples used are listed in the table below. Each polymer is available from Alco-Chemical, a group of Imperial Chemical Industries PLC, in Chattanooga, Tenn.

| Polymeric Material | 1:1 Oil to Water Ratio, using SFBASE ™ oil |
|---|---|
| ALCOQUM ® L344 polymer | Water-in-oil emulsion formed but weak and brittle with water break out. |
| ALCOGUM ® SL 920 polymer | No emulsion. |
| ALCOGUM ® SL 117 polymer | Water-in-oil emulsion formed but weak and brittle with water break out. |
| ALCOSPERSE ® 747 polymer | No emulsion. |
| EXP 3833 ™ polymer | No emulsion. |
| Calcium chloride (30 g) added | |
| ALCOQUM ® L344 polymer | No change, still weak, brittle water-in-oil emulsion. |
| ALCOGUM ® SL 920 polymer | Weak water-in-oil emulsion. |
| ALCOGUM ® SL 117 polymer | No change, still weak, brittle water-in-oil emulsion. |
| ALCOSPERSE ® 747 polymer | Very good oil-in-water emulsion. |
| EXP 3833 ™ polymer | Very good oil-in-water emulsion. |

Wherein ALCOGUM® L344, ALCOGUM® SL920 and ALCOGUM® SL117 are ethylacrylate/methacrylic acid polymers of roughly 100,000 mw hydrophobically modified with long chain fatty alcohol ethoxylates and ALCOSPERSE® 747 and EXP 3833° are stryene-acrylic acid polymers of approximately 3000 mw.

These results show that commercially available polymers having both hydrophilic and hydrophobic moieties can be adapted for use with commercially available oleaginous drilling fluid bases to make an emulsion based drilling fluid without a surfactant emulsion stabilizing agent. Some testing and adjustment may be needed to reach the optimum mixture or combination. Also as previously discussed, some modification of the polymer, such as may be effected by adding salt, can alter or improve, the ability of the polymer to stabilize the emulsion formed.

The present invention is well adapted to carry out the objects and attain the ends and advantages mentioned as well as those which are inherent therein. While numerous changes may be made by those skilled in the art, such changes are encompassed within the spirit and scope of this invention as defined by the appended claims.

What is claimed is:

1. A method of treating a subterranean formation comprising:
providing a treatment fluid that comprises a surfactant-free emulsion, the surfactant-free emulsion comprising an oleaginous fluid, a fluid that is at least partially immiscible with the oleaginous fluid, and non-surfactant ethylacrylate/methylacrylic acid polymeric emulsifier having hydrophilic moieties and hydrophobic moieties; and treating the subterranean formation;
wherein the polymeric emulsifier has a molecular weight of about 100,000, is substantially absorbed at the oil water interface of the emulsion, and has an internal phase fraction of about 0.1% to about 96%.

2. The method of claim 1 wherein the non-surfactant polymeric emulsifier interacts with the oleaginous fluid and the fluid that is at least partially immiscible with the oleaginous fluid to at least partially stabilize the surfactant-free emulsion.

3. The method of claim 1 wherein the method of treating the subterranean formation comprises a stimulation operation.

4. The method of claim 3 wherein the stimulation operation comprises a fracturing operation.

5. The method of claim 3 wherein the stimulation operation comprises an acid stimulation treatment.

6. The method of claim 5 wherein the acid stimulation treatment comprises a matrix acidizing process or a fracture acidizing process.

7. The method of claim 1 wherein the method of treating a subterranean formation comprises completing a well.

8. The method of claim 1 wherein the method of treating a subterranean formation comprises drilling a well bore.

9. The method of claim 1 further comprising flowing back a portion of the treatment fluid from the subterranean formation.

10. The method of claim 9 wherein the treatment fluid further comprises a breaker.

11. The method of claim 1 wherein the surfactant-free emulsion comprises a continuous phase and a discontinuous phase.

12. The method of claim 11 wherein the continuous phase comprises the oleaginous fluid.

13. The method of claim 11 wherein the continuous phase comprises the fluid that is at least partially immiscible with the oleaginous fluid.

14. The method of claim 1 wherein the hydrophilic and hydrophobic moieties of the non-surfactant polymeric emulsifier are balanced so as to promote and stabilize emulsification of the treatment fluid.

15. The method of claim 1 wherein said emulsion has a high internal phase fraction.

16. The method of claim 1 wherein said emulsion has an internal phase fraction of at least about 96%.

17. The method of claim 1 wherein the non-surfactant polymeric emulsifier comprises a non-surfactant polymer or combination of non-surfactant polymers.

18. The method of claim 17 wherein said polymers are amphoteric.

19. The method of claim 1 wherein the oleaginous fluid comprises diesel oil, crude oil, paraffin oil, olefin, ester, amide, amine, synthetic oil, ether, acetal, dialkyl carbonate, other hydrocarbons not a surfactant, or combinations thereof.

20. The method of claim 1 wherein the fluid that is at least partially immiscible with the oleaginous fluid comprises fresh water, sea water, salt water, or brine.

21. The method of claim 20 wherein the brine comprises a $H_2O$ soluble salt.

22. The method of claim 1 wherein the fluid that is at least partially immiscible with the oleaginous fluid comprises a heavy brine.

23. The method of claim 1 wherein the fluid that is at least partially immiscible with the oleaginous fluid comprises glycerin, polyglycol amine, glycol, polyol, a derivative thereof, or a combination thereof.

24. The method of claim 1 wherein the treatment fluid further comprises one or more non-surfactant additives comprising proppant particulates, gravel particulates, viscosifier, thinner, lubricant, anti-oxidant, weighting agent, $H_2O$ soluble salt, wetting agent, fluid loss agent, corrosion inhibitor, or scale inhibitor.

25. A method comprising:
   drilling a well bore in a subterranean formation using a surfactant-free emulsion drilling fluid that comprises:
   an oleaginous fluid;
   a fluid that is at least partially immiscible with the oleaginous fluid; and
   non-surfactant ethylacrylate/methacrylic acid polymeric emulsifier having a molecular weight of about 100,000 and hydrophilic and hydrophobic moieties such that the emulsifier is substantially absorbed at the emulsion interface between the oleaginous fluid and the at least partially immiscible fluid.

26. The method of claim 25 wherein the non-surfactant polymeric emulsifier is amphoteric.

27. The method of claim 25 wherein said emulsion has a high internal phase fraction.

28. The method of claim 25 wherein said emulsion has an internal phase fraction in the range of about 0.1% to about 96%.

29. The method of claim 25 wherein the non-surfactant polymeric emulsifier comprises a polymer or combination of polymers.

30. The method of claim 25 wherein the oleaginous fluid comprises diesel oil, crude oil, paraffin oil, olefin, ester, amide, amine, synthetic oil, ether, acetal, dialkyl carbonate, other hydrocarbons not a surfactant, or combinations thereof.

31. The method of claim 25 wherein the fluid that is at least partially immiscible with the oleaginous fluid comprises fresh water, sea water, salt water, or brine.

32. The method of claim 31 wherein the brine comprises a $H_2O$ soluble salt.

33. The method of claim 25 wherein the fluid that is at least partially immiscible with the oleaginous fluid comprises a heavy brine.

34. The method of claim 25 wherein the fluid that is at least partially immiscible with the oleaginous fluid comprises glycerin, polyglycol amine, polyol, a derivative thereof, or a combination thereof.

35. The method of claim 25 wherein the treatment fluid further comprises one or more non-surfactant additives comprising a viscosifier, a thinner, a lubricant, an anti-oxidant, a weighting agent, an $H_2O$ soluble salt, a wetting agent, a fluid loss agent, a corrosion inhibitor, or a scale inhibitor.

36. A method of fracturing a subterranean formation comprising:
   providing a surfactant-free emulsion composition comprising an oleaginous fluid, a fluid that is at least partially immiscible with the oleaginous fluid, a non-surfactant ethylacrylate/methacrylic acid polymeric emulsifier having a molecular weight of about 100,000 and hydrophilic and hydrophobic moieties such that the polymeric emulsifier is substantially absorbed at the oil water emulsion interface, and proppant particulates; and
   placing the surfactant-free emulsion composition into the subterranean formation at a pressure sufficient to create or enhance at least one fracture therein.

37. The method of claim 36 wherein the surfactant-free emulsion composition further comprises a breaker.

38. The method of claim 36 further comprising removing the surfactant-free emulsion composition from the subterranean formation while leaving at least a portion of the proppant particulates in the fracture.

39. The method of claim 38 wherein said removal of the emulsion is effected with a breaker that breaks down the polymeric emulsifier.

40. A method of installing a gravel pack comprising:
   providing a gravel pack surfactant-free emulsion composition comprising an oleaginous fluid, a fluid that is at least partially immiscible with the oleaginous fluid, a non-surfactant ethylacrylate/methacrylic acid polymeric emulsifier having a molecular weight of about 100,000 and hydrophilic and hydrophobic moieties, and gravel particulates; and
   introducing the composition to a well bore penetrating a subterranean formation so that the gravel particulates form a gravel pack substantially adjacent to a desired location in the well bore.

* * * * *